(12) United States Patent
Pan

(10) Patent No.: US 10,562,756 B2
(45) Date of Patent: Feb. 18, 2020

(54) VENT FLOW GUIDE FOR FILL HEAD

(71) Applicant: GM GLOBAL TECHNOLOGY OPERATIONS LLC, Detroit, MI (US)

(72) Inventor: Yong Pan, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 15/794,319

(22) Filed: Oct. 26, 2017

(65) Prior Publication Data

US 2019/0127207 A1  May 2, 2019

(51) Int. Cl.
*B67D 7/04* (2010.01)
*B60K 15/035* (2006.01)
*B60K 15/04* (2006.01)
*B67D 7/48* (2010.01)
*F01N 3/28* (2006.01)

(52) U.S. Cl.
CPC ............ *B67D 7/048* (2013.01); *B60K 15/035* (2013.01); *B60K 15/04* (2013.01); *B67D 7/48* (2013.01); *B60K 2015/03538* (2013.01); *B60K 2015/03576* (2013.01); *F01N 3/2896* (2013.01); *F01N 2610/142* (2013.01); *F01N 2610/1406* (2013.01); *F01N 2610/1413* (2013.01); *F01N 2610/1466* (2013.01)

(58) Field of Classification Search
CPC ..................... B67D 7/048; B67D 7/48; B60K 2015/03576; B60K 2015/03538; B60K 15/04; B60K 15/035
See application file for complete search history.

(56) References Cited

U.S. PATENT DOCUMENTS 6,523,582 B2 * 2/2003 Furuta .................... B60K 15/04
 141/286
10,029,560 B2 * 7/2018 Sekihara ................ B60K 15/04

* cited by examiner

*Primary Examiner* — Timothy L Maust
*Assistant Examiner* — Timothy P. Kelly
(74) *Attorney, Agent, or Firm* — Quinn IP Law

(57) ABSTRACT

An exemplary system for improving gaseous venting from a fluid storage vessel includes a hollow member configured to receive a fuel nozzle, the fuel nozzle having an aspirate opening, a vent line fluidly connecting the fluid storage vessel and the hollow member, and a flow guide device fluidly connected to the hollow member and the vent line. The flow guide device includes a flow guide chamber having an inlet, a plurality of sidewalls, and an outlet, and a plurality of directional blades formed within the flow guide chamber. The plurality of directional blades direct a fluid flow through the flow guide chamber and the hollow member toward the aspirate opening of the fuel nozzle.

17 Claims, 3 Drawing Sheets

VENT FLOW GUIDE FOR FILL HEAD

INTRODUCTION

The present invention relates generally to the field of vehicles and, more specifically, to a vent flow guide in a fuel fill head of a vehicle.

Automotive applications often include systems in which a supply of fluid is provided to and stored within a tank or vessel. During the fueling/refueling operation, one or more droplets of fluid may reach the fuel nozzle aspirate opening and cause a premature shut off of the fuel nozzle during the fueling process.

SUMMARY

Embodiments according to the present disclosure provide a number of advantages. For example, embodiments according to the present disclosure guide gaseous flow from a vent pipe of a tank or vessel fill system to minimize or prevent a flow of droplets toward a fuel nozzle aspirate opening, thereby preventing a premature shut off of the fuel nozzle during a fueling process.

In one aspect, a system for improving gaseous venting from a fluid storage vessel includes a hollow member configured to receive a fuel nozzle, the fuel nozzle having an aspirate opening. In some aspects, the system also includes a vent line fluidly connecting the fluid storage vessel and the hollow member and a flow guide device fluidly connected to the hollow member and the vent line. In some aspects, the flow guide device includes a flow guide chamber having an inlet, a plurality of sidewalls, and an outlet and a plurality of directional blades formed within the flow guide chamber. In some aspects, the plurality of directional blades direct a fluid flow through the flow guide chamber and the hollow member toward the aspirate opening of the fuel nozzle.

In some aspects, the hollow member is a fill head of a fill pipe subsystem for a fluid storage system.

In some aspects, the inlet of the flow guide chamber is fluidly connected to the vent line.

In some aspects, the plurality of directional blades generate a directed fluid flow within the hollow member.

In some aspects, the fluid storage vessel is a vehicle fuel storage tank.

In some aspects, the fluid storage vessel is a diesel exhaust fluid (DEF) storage tank.

In some aspects, the flow guide device is integrally formed with the hollow member.

In some aspects, the flow guide device is formed separately from the hollow member.

In another aspect, a fluid storage system includes a fluid storage vessel and a fill pipe subsystem fluidly connected to the fluid storage vessel. In some aspects, the fill pipe subsystem includes a hollow member configured to receive a fuel nozzle, the fuel nozzle having an aspirate opening, a fill pipe line fluidly connecting the fluid storage vessel and the hollow member, a vent line fluidly connecting the fluid storage vessel and the hollow member, and a flow guide device fluidly connected to the hollow member and the vent line. In some aspects, the flow guide device includes a flow guide chamber having an inlet, a plurality of sidewalls, and an outlet. In some aspects, the plurality of sidewalls of the flow guide chamber direct a fluid flow through the hollow member toward the aspirate opening of the fuel nozzle.

In some aspects, the fluid storage system further includes a plurality of directional blades formed within the flow guide chamber.

In some aspects, the plurality of directional blades generate a rotational fluid flow within the hollow member.

In some aspects, the hollow member is a fill head of the fuel storage system.

In some aspects, the inlet of the flow guide chamber is fluidly connected to the vent line.

In some aspects, the fluid storage vessel is a vehicle fuel storage tank.

In some aspects, the fluid storage vessel is a diesel exhaust fluid (DEF) storage tank.

In some aspects, the flow guide device is integrally formed with the hollow member.

In some aspects, the flow guide device is formed separately from the hollow member.

BRIEF DESCRIPTION OF THE DRAWINGS

The present disclosure will be described in conjunction with the following figures, wherein like numerals denote like elements.

Figure 1:
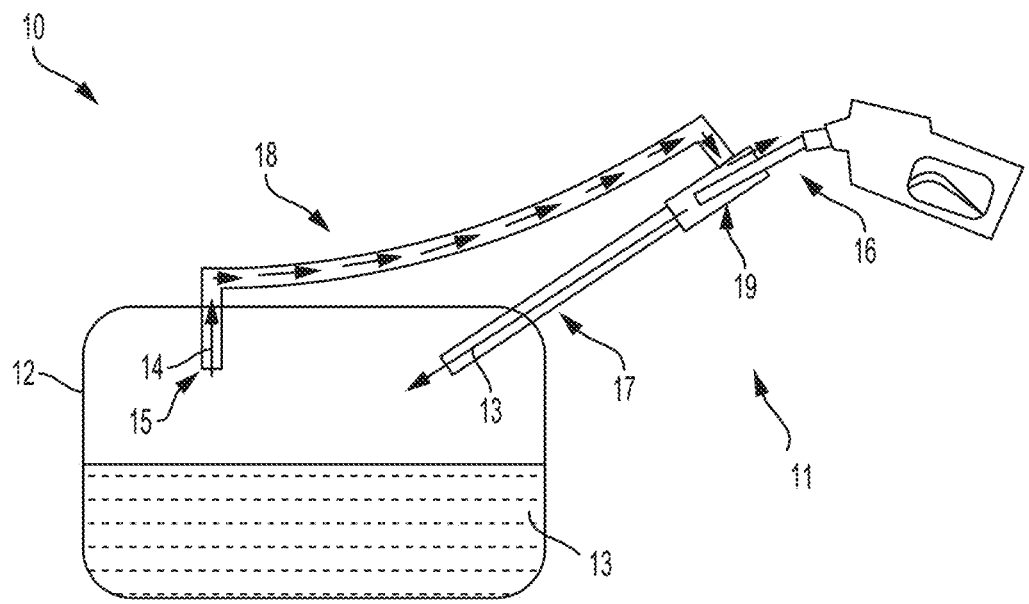
FIG. 1 is a schematic diagram of a tank assembly including a vent line, a fill pipe, and a fill head, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

To fill a fluid storage tank, such as for a diesel exhaust fluid (DEF) system, a fuel nozzle is inserted into a fill head of a fill pipe subsystem connected to the tank. The nozzle transmits fluid into the fill head and the fluid passes through a fill pipe and displaces the gases inside the tank. The gases or vapors within the tank are ventilated from the tank via a dedicated vent line that connects the tank with the fill head. A fuel nozzle includes an aspirate opening near the nozzle tip. If fluid droplets enter the aspirate opening on the nozzle during the fueling process, a sensor inside the nozzle will detected the droplets and shut off the nozzle. This shutoff function is designed for automatic shutoff of the nozzle when the tank is fully filled. However, if the nozzle is automatically shut off before the tank is fully filled due to one or more droplets entering the aspirate opening, a premature shut off condition results, leading to customer dissatisfaction.

Gaseous flow from the vent line enters the fill head near the fuel nozzle aspirate opening. As discussed herein, the gaseous flow from the vent line can be directed toward the nozzle aspirate opening to reduce or prevent liquid droplets from entering the aspirate opening and triggering the nozzle flow shut off sensors before the tank is fully filled.

FIG. 1 illustrates a fluid storage system 10 that may be installed in a vehicle. In some embodiments, the fluid storage system 10 is a DEF system that may be installed in a vehicle having a diesel-type internal combustion engine (not shown). In other embodiments, the fluid storage system 10 is a vehicle fuel storage system. The system 10 includes a fluid storage tank 12 having a fill pipe subsystem 11 including a fill pipe 17, a vent line 18, and a fill head 19. Vent line 18 includes an opening 15 at the end inside the tank 12. In some embodiments, fluid 13 is transferred to the tank 12 via a fuel nozzle 16 that fits at least partially within the fill head 19. To fill the tank 12 with fluid, the tank 12 must be able to breathe, that is, release the gas held within the tank 12 that is displaced by the entering fluid. In some embodiments, the gas is air. In some embodiments, the gas is a mixture of air and gasoline or diesel vapor. In some embodiments, gas exits the tank by traveling through the vent line 18, as shown by arrows 14. The vent line 18 rejoins the fill pipe 17 at the fill head 19 and allows the tank 12 to breathe as the tank 12 is filled with fluid.

Figure 2:
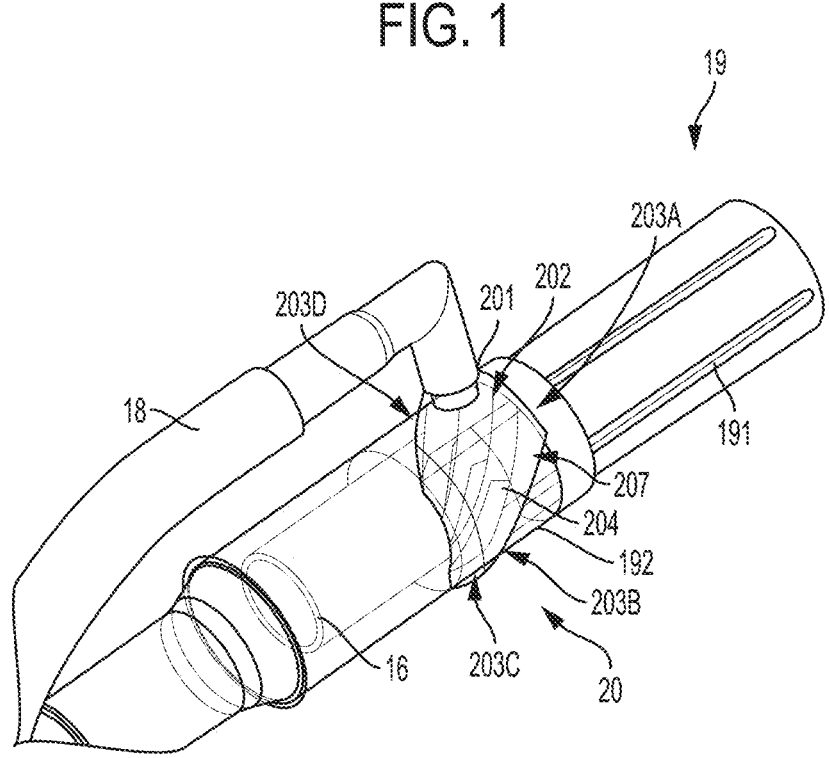
FIG. 2 is a schematic diagram of a fill head having a flow guide, according to an embodiment.

Referring now to FIG. 2, the fill head 19 is a hollow member that allows fluid to flow from the fuel nozzle 16 to the tank 12 via the fill pipe 17. In some embodiments, the fill head 19 is a hollow cylindrical member. In some embodiments, the fill head 19 is a hollow member of any shape, such as cylindrical, rectangular, etc.

The fill head 19 includes, in some embodiments, a first hollow portion 191 and a second hollow portion 192. The second portion 192 includes a flow guide 20. In some embodiments, the flow guide 20 includes a chamber and a plurality of directional blades to direct the flow of gas within the flow guide 20. In some embodiments, the flow guide 20 is an integrally formed with the fill head 19. In some embodiments, the flow guide 20 is formed separate from the fill head 19 and is connected to the fill head 19 during installation.

In some embodiments, the vent line 18 connects to the flow guide 20 at a connection member 201. In some embodiments, the connection member 201 is a cylindrical opening that connects the vent line 18 to a flow guide chamber 202 of the flow guide 20. The flow guide chamber 202 is defined by a plurality of sidewalls 203A, 203B, 203C, 203D, a lower surface (not shown), and an upper surface 207. In some embodiments, the flow guide chamber 202 includes a plurality of directional blades 204.

The connection member 201 is fluidly connected to the flow guide chamber 202 such that, as gas from the vent line 18 enters the chamber 202, the gas is directed toward an aspirate opening in the fuel nozzle 16 by the plurality of directional blades 204. In some embodiments, the connection member 201 extends outward from the upper surface 207 of the flow guide 20 and interfaces with the vent line 18. In some embodiments, the flow guide 20 includes three (3) directional blades 204. However, in other embodiments, the flow guide 20 includes more or fewer directional blades 204, such as, for example and without limitation one (1), two (2), four (4), five (5), six (6), or more directional blades 204. In some embodiments, the flow guide 20 includes zero (0) directional blades 204 and the sidewalls of the flow guide 20 direct the flow of gas within the flow guide chamber 202.

Figure 3:
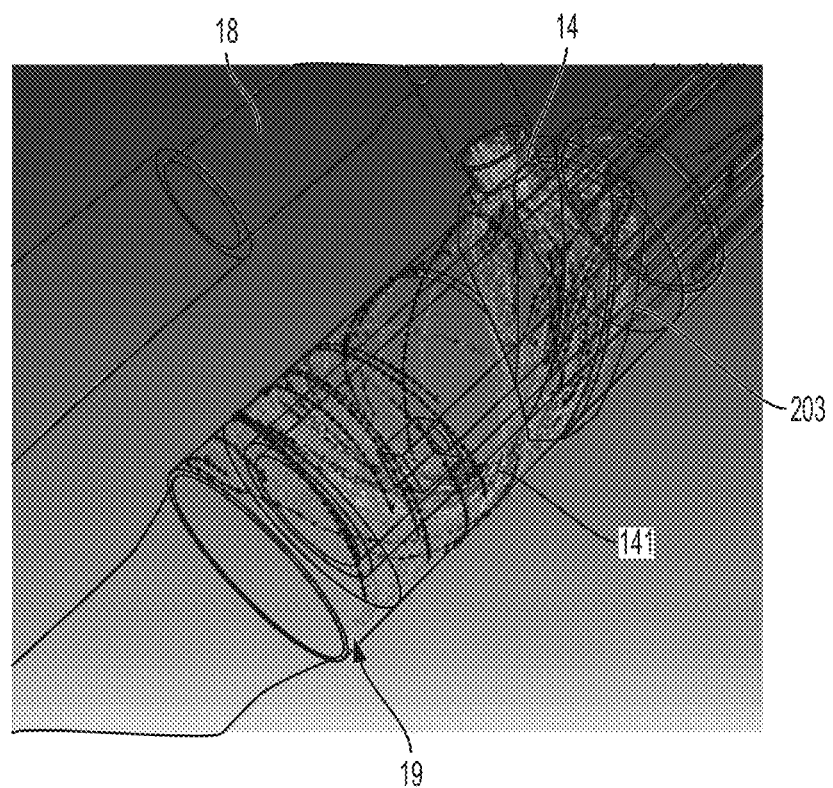
FIG. 3 is a schematic diagram illustrating gaseous flow within the fill head of FIG. 2, according to an embodiment.

With reference to FIG. 3, in some embodiments, the flow 14 exits the vent line 18 and enters the flow guide chamber 202. In some embodiments, the gas flows through the flow guide chamber 202 and is directed by the directional blades 204 to rotationally flow around and down the fuel nozzle 16 as shown by the lines 141. In some embodiments, the directional blades 204 direct the flow 14, 141 towards the aspirate opening in the fuel nozzle.

Figure 4:
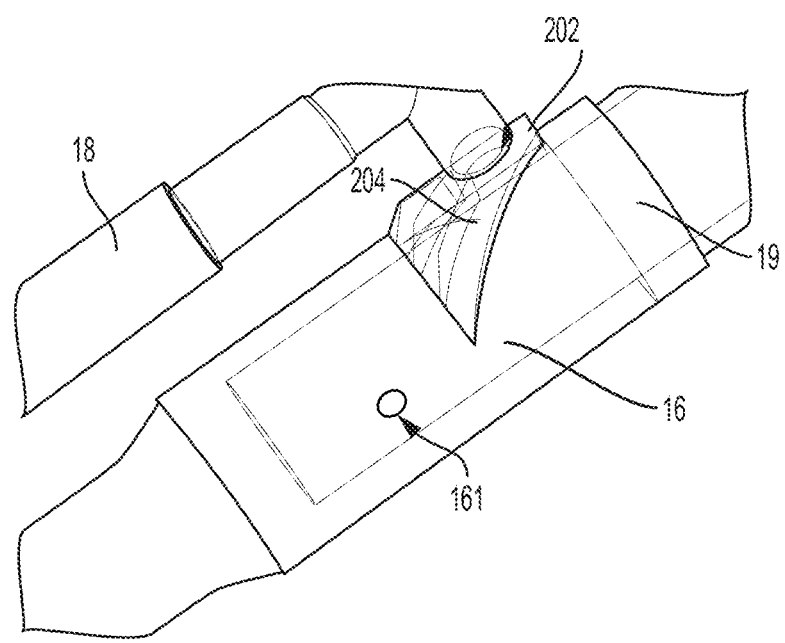
FIG. 4 is a schematic diagram of a fill head having a flow guide with a fuel nozzle having an aspirate opening, according to an embodiment.

FIG. 4 illustrates the fuel nozzle 16 within the fill head 19. The fuel nozzle 16 fits at least partially within the fill head 19 and extends beyond the flow guide chamber 202. That is, the fuel nozzle 16 extends toward the fill pipe 17. When the fuel nozzle 16 is inserted into the fill head 19 during a fueling operation, the end of the fuel nozzle 16 containing the aspirate opening 161 extends beyond the flow guide chamber 202 towards the fill pipe 17. In some embodiments, the gaseous flow 141 guided by the directional blades 204 swirls or rotationally flows around the end of the fuel nozzle 16. The gaseous flow 141 is directed toward and beyond the aspirate opening 161. The flow of gas within the fill head 19 due to the directional blades 204 of the flow guide 20 reduce or prevent the intrusion of fluid droplets into the aspirate opening 161.

Figure 5:
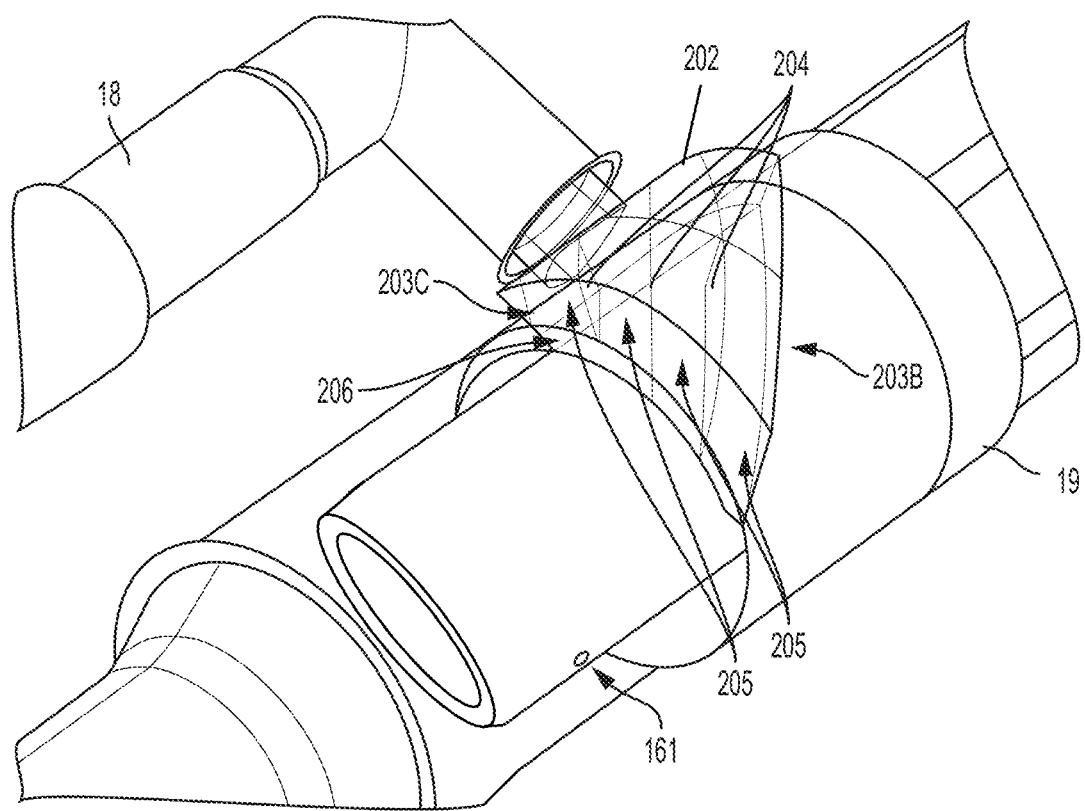
FIG. 5 is a schematic diagram of a fill head having a flow guide with a fuel nozzle having an aspirate opening, according to an embodiment.

FIG. 5 is a schematic view of the flow guide 20 and the fill head 19. In some embodiments, the directional blades 204, along with the sidewalls 203A, 203B, 203C, 203D, divide the flow guide chamber 202 into a plurality of channels 205. In some embodiments, an opening 206 allows gas to flow into the fill head 19 from the channels 205 of the flow guide 20. In some embodiments, a portion of the sidewall 203C defines the opening 206. In some embodiments, the opening 206 is an open portion of the flow guide 20 and is not defined by a portion of any sidewall. In some embodiments, the sidewalls 203A, 203B, 203C, 203D of the flow guide 20 direct the flow of gas within the flow guide chamber 202.

At the end of the fueling/refueling process, the fluid inside the filled tank 12 will block the vent opening 15. Gas will no longer flow from the tank 12 through the vent line 18 and the flow guide 20. Because there is no gaseous flow through the flow guide 20, there is no gaseous flow directed to the nozzle aspirate opening 161 and fluid droplets can reach and enter the fuel nozzle aspirate opening 161 to trigger the automatic shut-off feature for a normal fueling/refueling process.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such condition& language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about (to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for improving gaseous venting from a fluid storage vessel, the system comprising:
    a hollow member defining a first outer surface and configured to receive a fuel nozzle, the fuel nozzle having an aspirate opening;
    a vent line fluidly connecting the fluid storage vessel and the hollow member; and
    a flow guide device fluidly connected to the hollow member and the vent line, the flow guide device comprising
        a flow guide chamber extending outward of the hollow member and having an inlet, a plurality of sidewalls, and an outlet, the flow guide chamber defining a second outer surface and an inner surface opposite the second outer surface, the second outer surface separate from the first outer surface of the hollow member such that the flow guide chamber encircles a portion of the first outer surface of the hollow member; and a plurality of directional blades formed within the flow guide chamber;

wherein the plurality of directional blades direct a fluid flow through the flow guide chamber and the hollow member toward the aspirate opening of the fuel nozzle.

2. The system of claim 1, wherein the hollow member is a fill head of a fill pipe subsystem for a fuel storage system.

3. The system of claim 1, wherein the inlet of the flow guide chamber is fluidly connected to the vent line.

4. The system of claim 1, wherein the plurality of directional blades generate a directed fluid flow within the hollow member.

5. The system of claim 1, wherein the fluid storage vessel is a vehicle fuel storage tank.

6. The system of claim 1, wherein the fluid storage vessel is a diesel exhaust fluid (DEF) storage tank.

7. The system of claim 1, wherein the flow guide device is integrally formed with the hollow member.

8. The system of claim 1, wherein the flow guide device is formed separately from the hollow member.

9. A fluid storage system, comprising:
a fluid storage vessel; and
a fill pipe subsystem fluidly connected to the fluid storage vessel, the fill pipe subsystem comprising
a hollow member defining a first outer surface and configured to receive a fuel nozzle, the fuel nozzle having an aspirate opening;
a fill pipe line fluidly connecting the fluid storage vessel and the hollow member;
a vent line fluidly connecting the fluid storage vessel and the hollow member; and
a flow guide device fluidly connected to the hollow member and the vent line, the flow guide device comprising
a flow guide chamber extending outward of the first outer surface of the hollow member and having an inlet, a plurality of sidewalls, and an outlet;
wherein the plurality of sidewalls of the flow guide chamber direct a fluid flow through the hollow member toward the aspirate opening of the fuel nozzle.

10. The fluid storage system of claim 9, further comprising a plurality of directional blades formed within the flow guide chamber.

11. The fluid storage system of claim 10, wherein the plurality of directional blades generate a rotational fluid flow within the hollow member.

12. The fluid storage system of claim 9, wherein the hollow member is a fill head of the fill pipe subsystem of the fluid storage system.

13. The fluid storage system of claim 9, wherein the inlet of the flow guide chamber is fluidly connected to the vent line.

14. The fluid storage system of claim 9, wherein the fluid storage vessel is a vehicle fuel storage tank.

15. The fluid storage system of claim 9, wherein the fluid storage vessel is a diesel exhaust fluid (DEF) storage tank.

16. The fluid storage system of claim 9, wherein the flow guide device is integrally formed with the hollow member.

17. The fluid storage system of claim 9, wherein the flow guide device is formed separately from the hollow member.

* * * * *